United States Patent
Wentink

(10) Patent No.: US 8,700,780 B2
(45) Date of Patent: Apr. 15, 2014

(54) GROUP OWNER SELECTION WITH CROSSING REQUESTS

(75) Inventor: Maarten Menzo Wentink, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 12/903,949

(22) Filed: Oct. 13, 2010

(65) Prior Publication Data

US 2011/0093536 A1 Apr. 21, 2011

Related U.S. Application Data

(60) Provisional application No. 61/252,052, filed on Oct. 15, 2009.

(51) Int. Cl.
*G06F 15/173* (2006.01)
*G06F 15/16* (2006.01)
*G06F 11/00* (2006.01)
*H04W 4/00* (2009.01)

(52) U.S. Cl.
USPC .......... 709/226; 709/224; 709/229; 714/4.11; 455/434

(58) Field of Classification Search
None
See application file for complete search history.

(56) References Cited

U.S. PATENT DOCUMENTS

| | | | |
|---|---|---|---|
| 6,810,259 B1 * | 10/2004 | Zhang | 455/456.5 |
| 7,451,221 B2 * | 11/2008 | Basani et al. | 709/226 |
| 2004/0111612 A1 | 6/2004 | Choi et al. | |
| 2005/0059420 A1 * | 3/2005 | Salokannel et al. | 455/522 |
| 2006/0246947 A1 | 11/2006 | Fujii et al. | |
| 2007/0249341 A1 * | 10/2007 | Chu et al. | 455/434 |
| 2008/0069001 A1 | 3/2008 | Aschauer et al. | |
| 2008/0288580 A1 | 11/2008 | Wang et al. | |
| 2010/0162036 A1 * | 6/2010 | Linden et al. | 714/4 |

FOREIGN PATENT DOCUMENTS

JP 2006311138 A 11/2006

OTHER PUBLICATIONS

International Search Report and Written Opinion—PCT/US2010/052600—International Search Authority, European Patent Office, Jan. 12, 2011.
Wi-Fi Alliance Technical Committee P2P Task Group, "Wi-Fi Peer-to-Peer (P2P) Technical Specification", Draft Version 0.21, 111 pages, Oct. 5, 2009.
Taiwan Search Report—TW099135127—TIPO—Jun. 6, 2013.

* cited by examiner

*Primary Examiner* — Wen-Tai Lin
(74) *Attorney, Agent, or Firm* — James K. O'Hare

(57) ABSTRACT

A method of operating an apparatus, and apparatus, and a computer program product in an apparatus are provided in which a first request message is sent to a second apparatus. The first request message is associated with first information. In addition, a second request message is received from the second apparatus. The second request message is associated with second information. In addition, the first information and the second information are compared. Furthermore, whether to send a response to the second apparatus in response to the second request message is determined based on the comparison of the first information and the second information.

40 Claims, 9 Drawing Sheets

| Field | Size (Octets) | Value | Description |
|---|---|---|---|
| Attribute ID | 1 | 4 | Type of P2P Attribute |
| Length | 2 | 1 | Length of the following fields in the attribute |
| Group Owner Intent | 1 | Variable | Information used to decide which P2P device will be the next P2P Group Owner |

FIG. 6A

| Bit(s) | Information | Value | Notes |
|---|---|---|---|
| 0 | Tie Breaker | 0 or 1 | Indicates which device becomes the Group Owner when the intent values are the same. |
| 1-7 | Intent | 0 - 15 | Relative value between 0 and 15 used to indicate the desire of the P2P device to be the P2P Group Owner, with a larger value indicating a higher desire. |

FIG. 6B

GROUP OWNER SELECTION WITH CROSSING REQUESTS

CROSS-REFERENCE TO RELATED APPLICATION(S)

This application claims the benefit of U.S. Provisional Application Ser. No. 61/252,052, entitled "Group Owner Selection with Crossing Requests" and filed on Oct. 15, 2009, which is expressly incorporated by reference herein in its entirety.

BACKGROUND

1. Field

The present disclosure relates generally to communication systems, and more particularly, to group owner selection with crossing requests.

2. Background

WLAN devices can discover each other and share data traffic without the instance of a traditional access point. As part of the discovery, one of the devices should be a group owner. To determine the group owner between two devices, the two devices participate in group owner negotiation. The two devices may at around the same time send a group owner negotiation request. A mechanism is needed to determine how to handle such crossing group owner negotiation requests.

SUMMARY

In an aspect of the disclosure, a method of operating an apparatus, and apparatus, and a computer program product in an apparatus are provided in which a first request message is sent to a second apparatus. The first request message is associated with first information. In addition, a second request message is received from the second apparatus. The second request message is associated with second information. In addition, the first information and the second information are compared. Furthermore, whether to send a response to the second apparatus in response to the second request message is determined based on the comparison of the first information and the second information.

BRIEF DESCRIPTION OF THE DRAWINGS

FIG. 6A is a table showing a Group Owner Intent attribute format.

FIG. 6B is a table showing a Group Owner Intent field definition.

DETAILED DESCRIPTION

Figure 1:
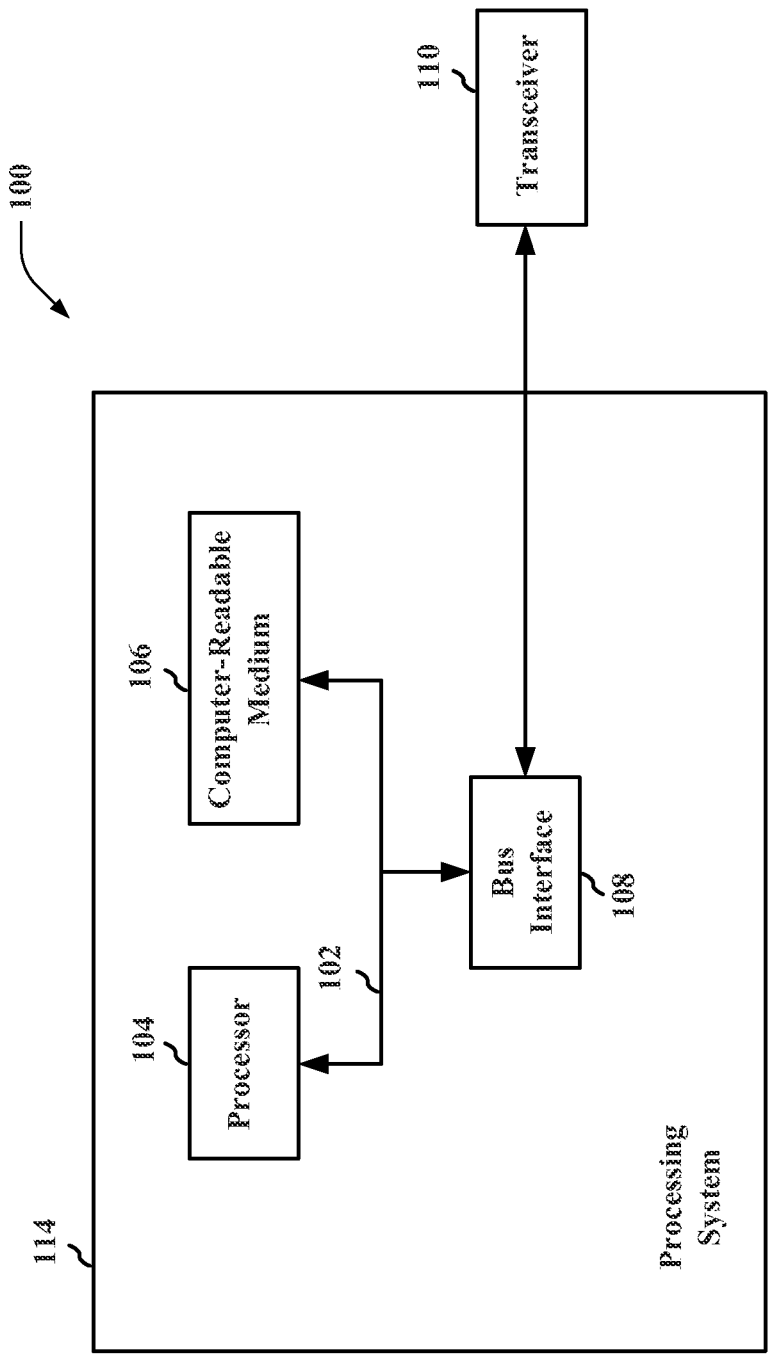
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
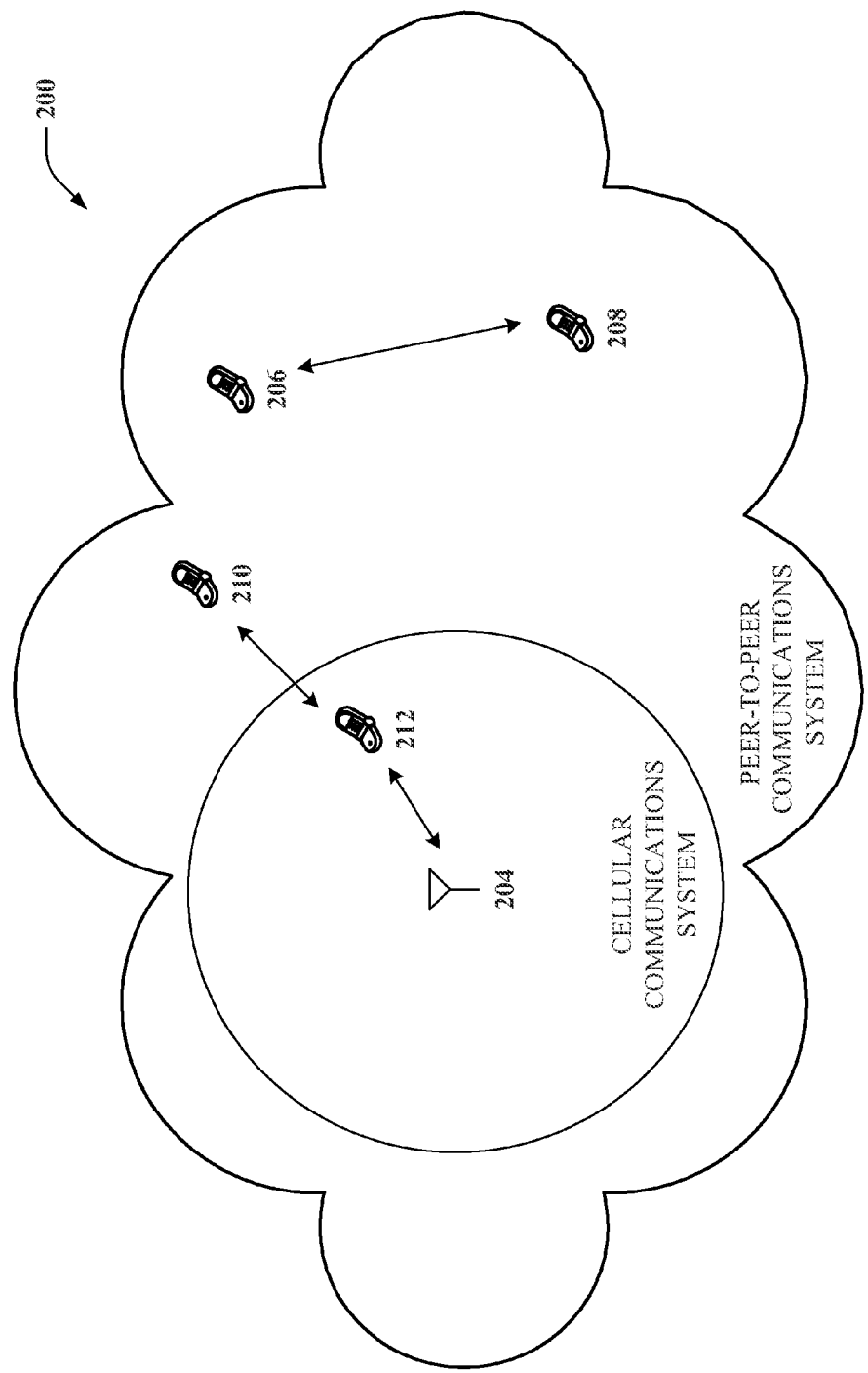
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
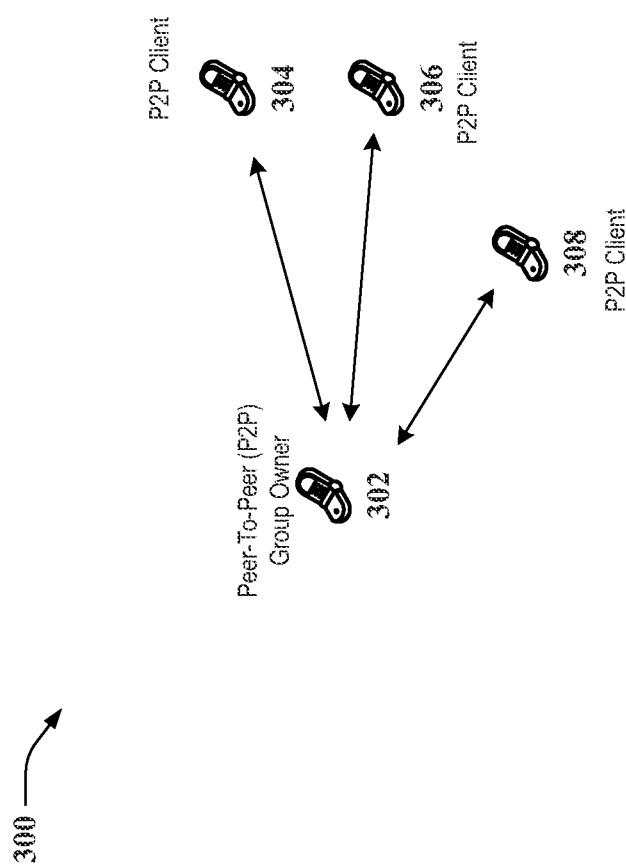
FIG. 3 is a diagram illustrating peer-to-peer topology between a peer-to-peer group owner and peer-to-peer clients.

FIG. 3 is a diagram 300 illustrating a peer-to-peer topology between a peer-to-peer group owner and peer-to-peer clients. A peer-to-peer group of peer-to-peer devices includes one peer-to-peer group owner and one or more clients connected to the group owner. As shown in FIG. 3, the wireless device 302 is the peer-to-peer group owner and the wireless devices 304, 306, 308 are peer-to-peer clients connected to the peer-to-peer owner.

Figure 4:
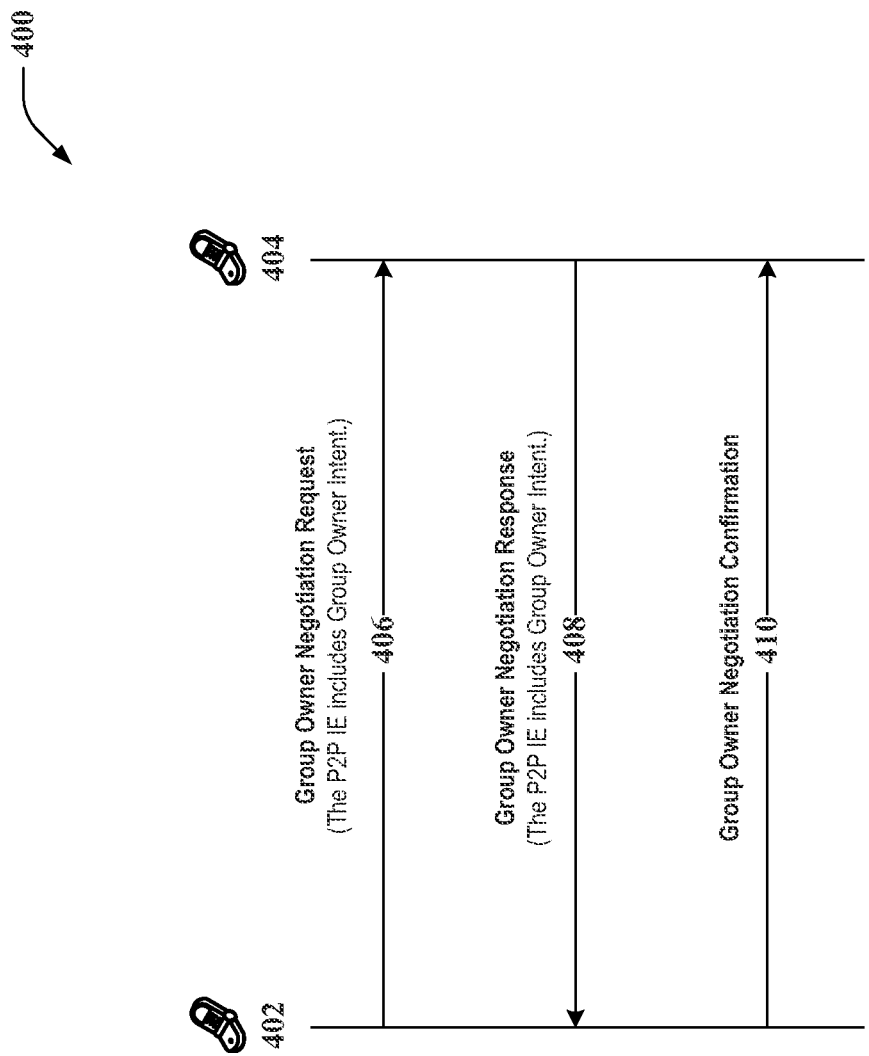
FIG. 4 is a diagram illustrating group owner negotiation message exchange.

FIG. 4 is a diagram 400 illustrating a group owner negotiation message exchange. To determine the peer-to-peer group owner between two devices, the two devices participate in group owner negotiation. As shown in FIG. 4, the wireless device 402 sends a group owner negotiation request 406 to the wireless device 404. The group owner negotiation request 406 includes a peer-to-peer information element (IE), which includes a Group Owner Intent attribute including a group owner intent value indicating the intent of the wireless device 402 to be group owner. Any range of values may be used to indicate intent. In one example, the values range from 0 to 15, with 0 indicating no desire to be the group owner and 15 indicating a necessity to be the group owner. The wireless device 404 responds to the request by sending a group owner negotiation response 408. The group owner negotiation response 408 includes a peer-to-peer IE, which includes a Group Owner Intent attribute including a group owner intent value indicating the intent of the wireless device 404 to be group owner. If group ownership is decided between the wireless devices 402, 404, the wireless device 402 responds to the group owner negotiation response 408 with a group owner negotiation confirmation 410. Besides a group owner intent value, the Group Owner Intent attribute includes a tie breaker value, which is used to determine the group owner when the group owner intent values are the same.

Figure 5:
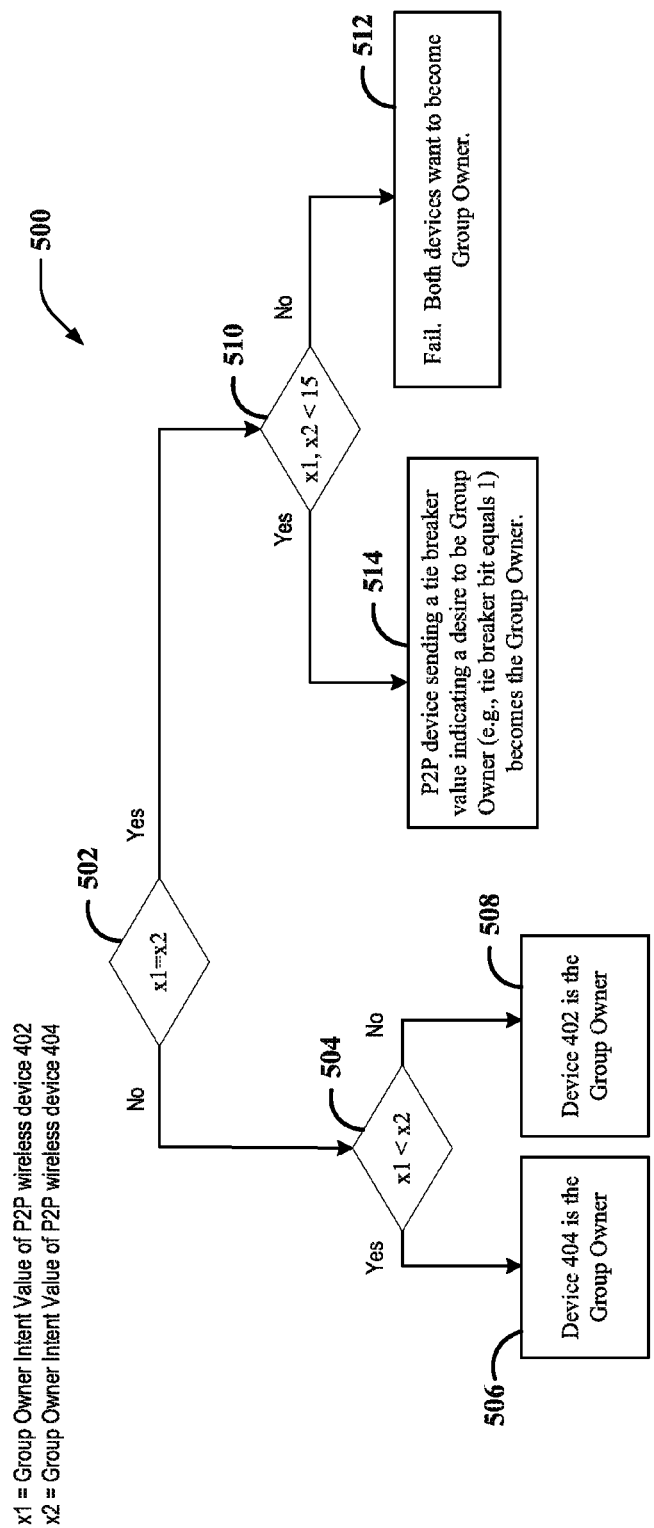
FIG. 5 is a diagram illustrating a method of group owner determination.

FIG. 5 is a diagram 500 illustrating a method of group owner determination. The value $x1$ is the group owner intent value of the wireless device 402 and the value $x2$ is the group owner intent value of the wireless device 404. If $x1$ does not equal $x2$ (502), and $x1$ is less than $x2$ (504), then the wireless device 404 is the group owner (506). Otherwise, if $x1$ is not less than $x2$ (504), then the wireless device 402 is the group owner (508). If $x1$ equals $x2$ (502), and both $x1$ and $x2$ are equal to 15 (or equal to a value indicating a necessity to be group owner) (510), then the group owner negotiation fails due to both wireless devices 402, 404 wanting to be group owner (512). Otherwise, if $x1$ equals $x2$ and both $x1$ and $x2$ are less than 15, then group ownership is determined based on a tie breaker value sent by the wireless device 402, 404 (514).

Referring again to FIG. 4, the group owner negotiations request 406 includes a Group Owner Intent attribute, which includes a tie breaker value. The tie breaker value may be a bit, for example, with 0 indicating that a tie between the wireless devices 402, 404 with respect to group owner intent is settled by the receiving device becoming group owner and a 1 indicating that the tie is settled by the sending device becoming group owner. The tie breaker value may be set randomly by the wireless device 402, or more generally such that values 0 and 1 occur evenly on average. The tie breaker value sent in the group owner negotiation response 408 by the wireless device 404 may be toggled from the corresponding group owner negotiation request 406. For example, if the group owner negotiation request 406 includes a tie breaker value of 0, then the group owner negotiation response 408 will include a tie breaker value of 1, and therefore wireless device 404 will become the group owner in case of a tie. On the other hand, if the group owner negotiation request 406 includes a tie breaker value of 1, then the group owner negotiation response 408 will include a tie breaker value of 0, and therefore the wireless device 402 will become the group owner in case of a tie.

FIG. 6A is a table 600 showing a Group Owner Intent attribute format. As shown in FIG. 6A, the Group Owner Intent attribute includes an attribute identifier (ID) field, a length field, and a group owner intent field. The attribute ID field is shown as 4, but may be any predetermined value used to indicate that the attribute is for group owner intent. The length field is the length of the following fields in the attribute. The group owner intent field is a variable value as shown in FIG. 6B.

FIG. 6B is a table 650 showing a group owner intent field definition. The group owner intent field includes a group owner intent value for indicating a degree of intent of being the group owner. The group owner intent value may be a relative value between 0 and 15 used to indicate the degree of desire of the wireless device in being the group owner. A 0 may indicate no desire and a 15 may indicate a necessity to be group owner, with values in between 0 and 15 indicating a degree of intent of being the group owner in between the extremes. Although the intent value is indicated being between 0 and 15, other values may be used to indicate the group owner intent. The group owner intent field also includes a tie breaker value, which as discussed supra, may be a bit, with a 0 indicating the device receiving the group owner negotiation message with the Group Owner Intent attribute should be the group owner and a 1 indicating the device sending the group owner negotiation message with the Group Owner Intent attribute should be the group owner.

Figure 7:
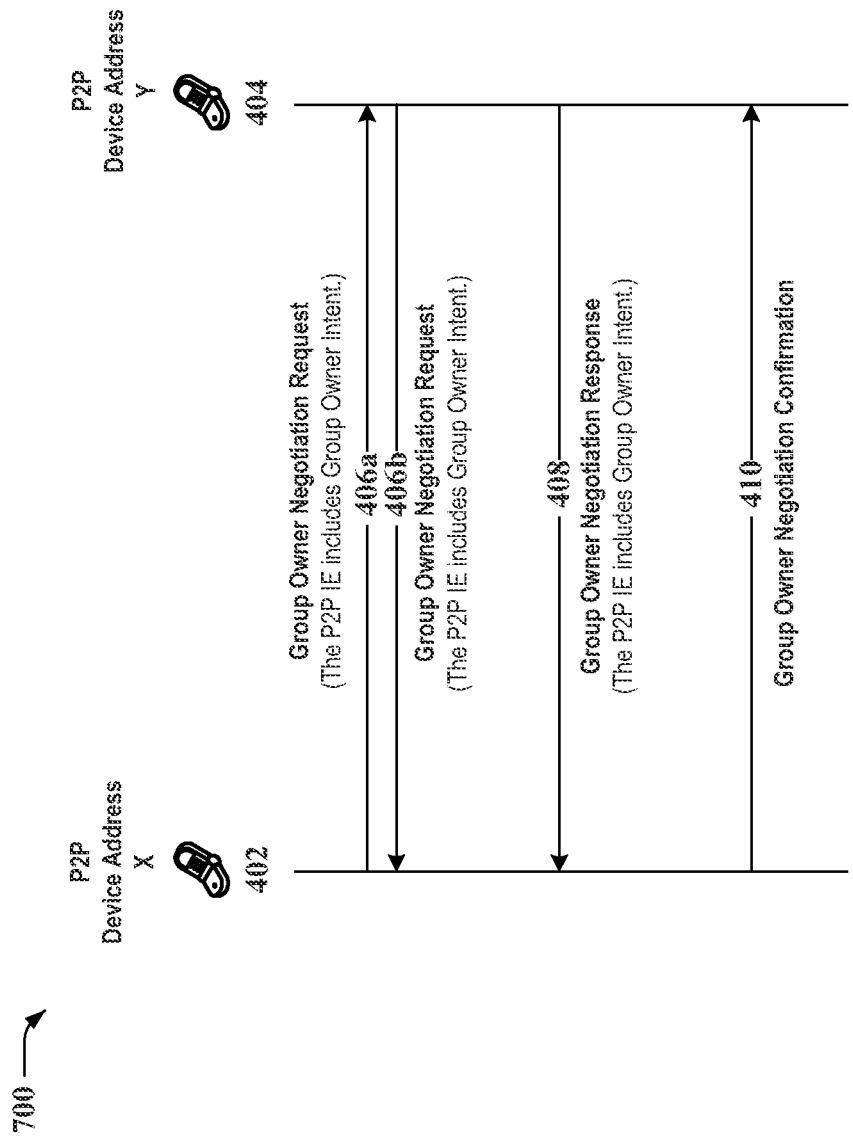
FIG. 7 is a diagram for illustrating an exemplary method.

FIG. 7 is a diagram 700 for illustrating an exemplary method. As shown in FIG. 7, two group owner negotiation requests 406a, 406b may be transmitted by the wireless devices 402, 404, respectively, at around the same time. This may occur because after generation of the group owner negotiation request, the request may get queued for some time to wait for channel access. In such crossing requests, each of the wireless devices 402, 404 receives a group owner negotiation request instead of the expected group owner negotiation response. Each of the wireless devices 402, 404 has a peer-to-peer device address. The peer-to-peer device address may be a media access control (MAC) address. In FIG. 7, the peer-to-peer device address for wireless device 402 is shown as X and the peer-to-peer device address for wireless device 404 is shown as Y. In an exemplary method, the wireless devices 402, 404 determine whether to send a group owner negotiation response based on the respective peer-to-peer devices addresses X, Y. In one configuration, the wireless device with the highest peer-to-peer device address responds with a group owner negotiation request and terminates (internally) the group owner negotiation that the wireless device initiated, and the wireless device with the lowest peer-to-peer device address silently discards the received group owner negotiation request. The device sending the group owner negotiation response does not implicitly become group owner, because the group owner is still determined based upon the group owner intent and tie breaker values that are exchanged in the group owner negotiation request and the group owner negotiation response.

For example, assume the peer-to-peer device address Y is higher (or greater) than the peer-to-peer device address X (i.e., Y>X). The wireless device 402 compares its peer-to-peer device address X with the peer-to-peer device address Y of the wireless device 404 that sent the group owner negotiation request 406b. The wireless device 402 determines that its peer-to-peer device address X is lower and therefore discards the received group owner negotiation request 406b. Further, the wireless device 404 compares its peer-to-peer device address Y with the peer-to-peer device address X of the wireless device 402 that sent the group owner negotiation request 406a. The wireless device 404 determines that its peer-to-peer device address is higher and therefore terminates the group owner negotiation initiated by sending the group owner negotiation request 406b and responds with a group owner negotiation response 408 to the group owner negotiation request 406a. In response to the group owner negotiation response 408, the wireless device 402 sends a group owner negotiation confirmation 410.

The group owner negotiation response indicates whether the group owner negotiation has failed. As such, in case of crossing group owner negotiation requests, if the wireless device 402 indicates a necessity to be the group owner in the group owner negotiation request 406a and the wireless device 404, with a higher peer-to-peer device address Y than the peer-to-peer device address X of the wireless device 402, sends a group owner negotiation response 408 that also indicates a necessity to be the group owner (e.g., both the request and the response indicate a group owner intent of 15), the group owner negotiation response 408 also indicates a group owner negotiation failure.

Other configurations are possible other than making the determination of whether to respond with a group owner negotiation response based on whether the peer-to-peer device address is highest. In another configuration, the wireless device with the lowest peer-to-peer device address responds with a group owner negotiation request and terminates the group owner negotiation that the wireless device initiated, and the wireless device with the highest peer-to-peer device address silently discards the received group owner negotiation request. In yet another configuration, the determination of whether to respond may be based on a comparison of some device generated values, the values being generated by a mapping (e.g., a hash) of the peer-to-peer device addresses. The mapping is known by each of the two wireless devices.

As discussed supra, the peer-to-peer device address may be a MAC address. MAC addresses are unique for all devices, so there will always be one device with a lower MAC address. Any other unique property of the devices may be used for the purpose of deciding which device sends the response. This property does not have to be globally unique, as long as it is unique between the two devices involved in the group owner negotiation.

Figure 8:
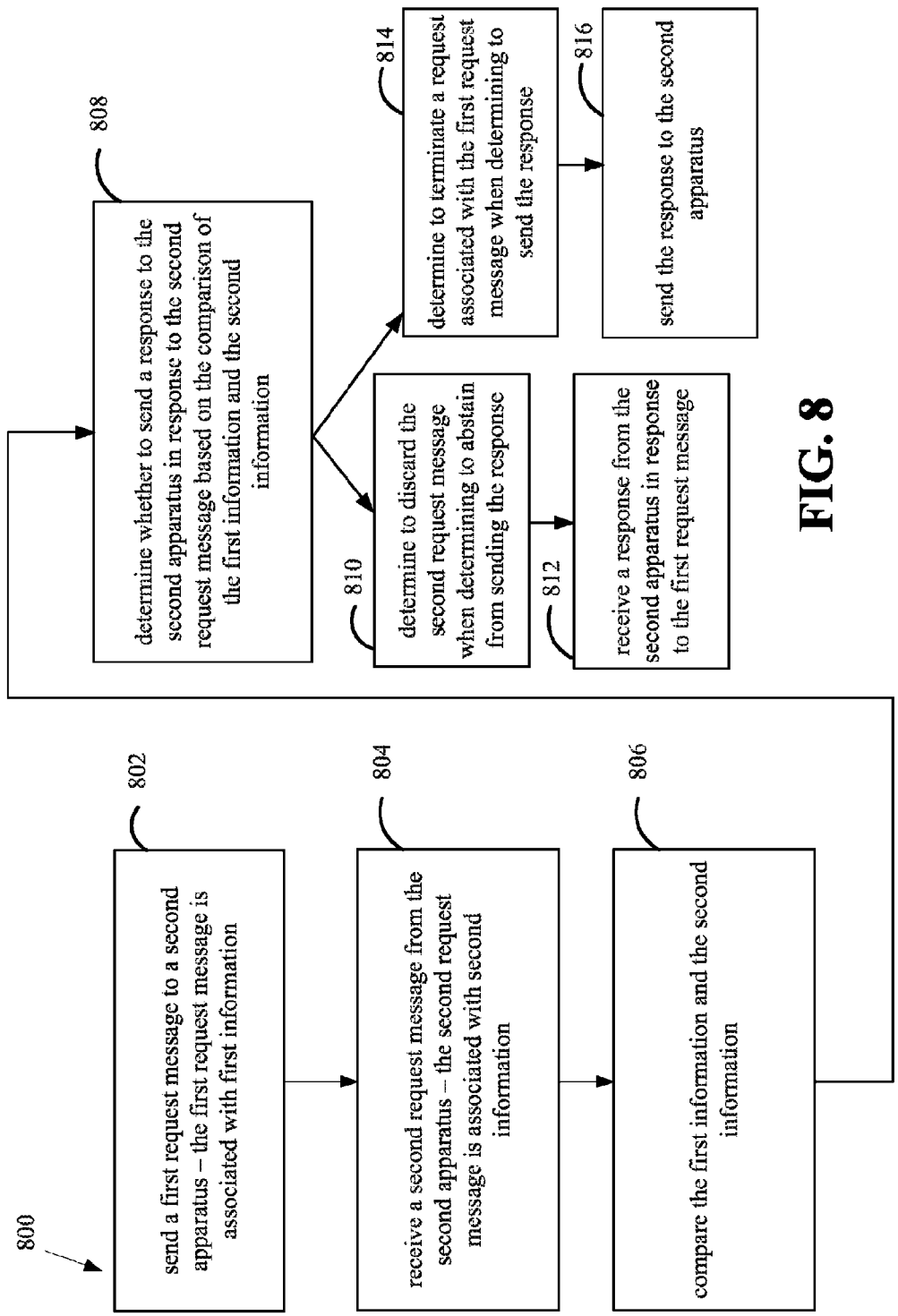
FIG. 8 is a flow chart of a method of wireless communication.

FIG. 8 is a flow chart 800 of an exemplary method. The method is performed by an apparatus, such as the wireless device 404. As shown in FIG. 7 and FIG. 8, the apparatus 404 sends a first request message 406b to a second apparatus 402 (802). The first request message 406b is associated with first information (e.g., the peer-to-peer device address Y) (802). The apparatus 404 receives a second request message 406a from the second apparatus 402 (804). The second request message 406a is associated with second information (e.g., peer-to-peer device address X) (804). The apparatus 404 compares the first information and the second information (806). The apparatus 404 determines whether to send a response 408 to the second apparatus 402 in response to the second request message 406a based on the comparison of the first information and the second information (808).

The apparatus 404 receives the second request message 406a before a response is received from the second apparatus 402 in response to the first request message 406b. The apparatus 404 determines to discard the second request message 406a when determining not to send the response 408 (810) and receives a response from the second apparatus 402 in response to the first request message 406b (812). After step 812, the apparatus 404 may determine the group owner based on the information in the first request and the response. The apparatus 404 determines to terminate a request associated with the first request message 406b upon determining to send the response 408 (814) and sends the response 408 to the second apparatus 402 (816). After step 816, the group owner may be decided by the second apparatus 402 based on the information in the second request and the response.

The first information may include a peer-to-peer device address Y of the apparatus 404 and the second information may include a peer-to-peer device address X of the second apparatus 402. As discussed supra, the peer-to-peer device address Y of the apparatus 404 may be a MAC address of the apparatus 404 and the peer-to-peer device address X of the second apparatus 402 may be a MAC address of the second apparatus 402. In one configuration, the apparatus 404 determines whether to send the response 408 based on whether the peer-to-peer device address Y of the apparatus 404 is higher or lower than the peer-to-peer device address X of the second apparatus 402. In one configuration, the apparatus 404 determines whether to send the response 408 by determining to send the response 408 when the peer-to-peer device address Y of the apparatus 404 is higher than the peer-to-peer device address X of the second apparatus 402 and determining to abstain from sending the response 408 when the peer-to-peer device address Y of the apparatus 404 is lower than the peer-to-peer device address X of the second apparatus 402.

The first request message may be a first group owner negotiation request, the second request message may be a second group owner negotiation request, and the response may be a group owner negotiation response. In one configuration, the first group owner negotiation request includes a first group owner negotiation intent; the second group owner negotiation request includes a second group owner negotiation intent; and the response, if sent to the second apparatus in response to the second request message, includes the first group owner negotiation intent. In another configuration, the response, if sent, includes a group negotiation failure indication when the first group owner negotiation intent and the second group owner negotiation intent both indicate a necessity to be group owner (e.g., both indicate a group owner intent of 15).

Figure 9:
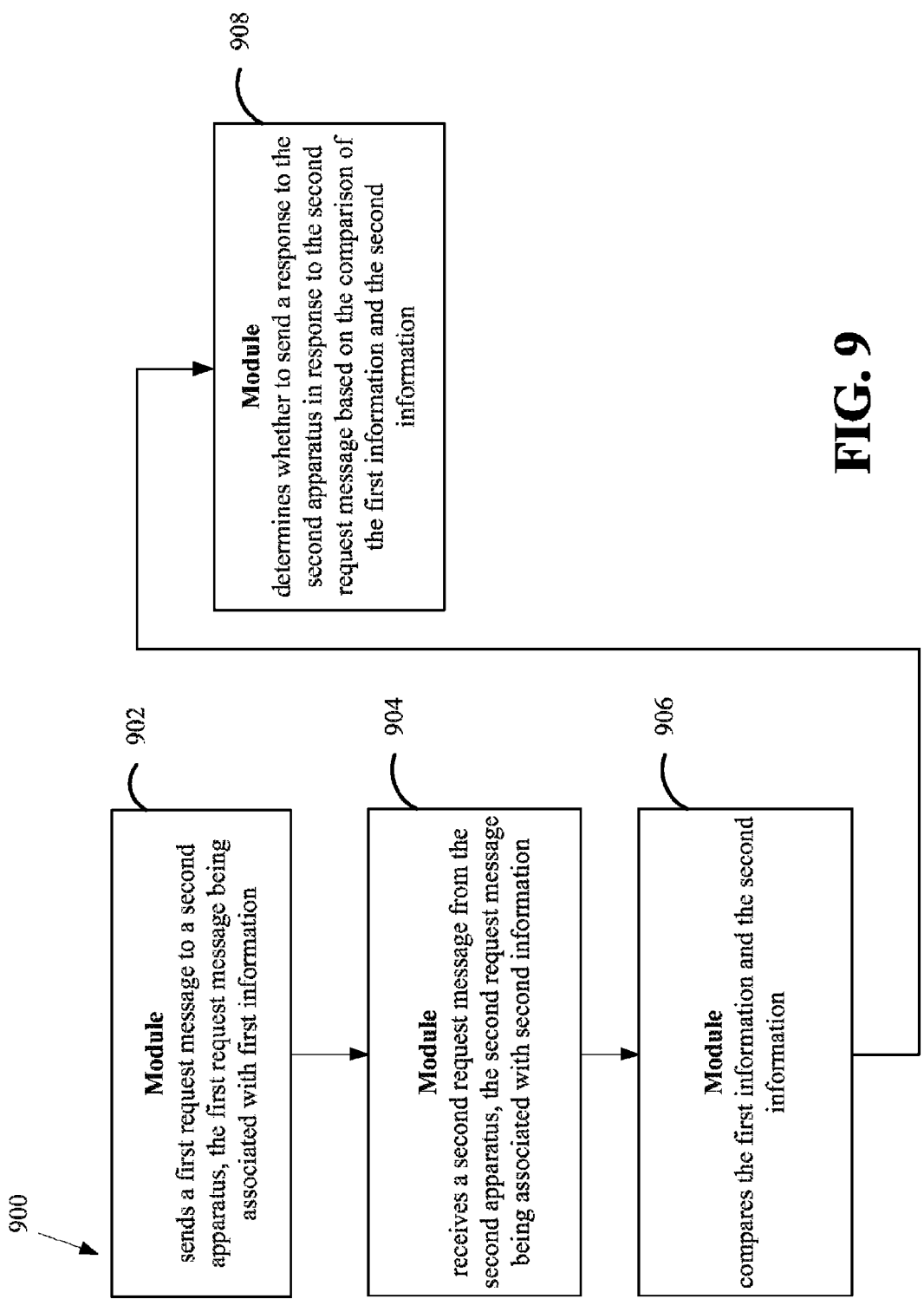
FIG. 9 is a conceptual block diagram illustrating the functionality of an exemplary apparatus.

FIG. 9 is a conceptual block diagram 900 illustrating the functionality of an exemplary apparatus 100, such as a wireless device. The apparatus 100 includes a module 902 that sends a first request message 406b to a second apparatus. The first request message 406b is associated with first information (e.g., MAC address of the apparatus). The apparatus 100 further includes a module 904 that receives a second request message 406a from the second apparatus. The second request message 406a is associated with second information (e.g., MAC address of the second apparatus). In addition, the apparatus 100 includes a module 906 that compares the first information and the second information. Furthermore, the apparatus 100 includes a module 908 that determines whether to send a response 408 to the second apparatus in response to the second request message 406a based on the comparison of the first information and the second information.

Referring to FIG. 1, in one configuration, the apparatus 100 for wireless communication includes means for sending a first request message to a second apparatus. The first request message is associated with first information. The apparatus 100 further includes means for receiving a second request message from the second apparatus. The second request message is associated with second information. In addition, the apparatus 100 includes means for comparing the first information and the second information. Furthermore, the apparatus 100 includes means for determining whether to send a response to the second apparatus in response to the second request message based on the comparison of the first information and the second information. In one configuration, the apparatus 100 further includes means for determining to discard the second request message when determining to abstain from sending the response, and means for receiving a response from the second apparatus in response to the first request message. In one configuration, the apparatus 100 further includes means for determining to terminate a request associated with the first request message when determining to send the response, and means for sending the response to the second apparatus. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating an apparatus, comprising:
   sending a first request message to a second apparatus, the first request message being associated with first information;
   receiving a second request message from the second apparatus, the second request message being associated with second information;
   comparing the first information and the second information;
   determining whether to send a response to the second apparatus in response to the second request message based on the comparison of the first information and the second information;
   determining to discard the second request message when determining to abstain from sending the response,
   wherein the first request message is a first group owner negotiation request including a first group owner negotiation intent, the second request message is a second group owner negotiation request including a second group owner negotiation intent, and the response is a group owner negotiation response, wherein if the response is sent to the second apparatus in response to the second request message, the group owner negotiation response includes the first group owner negotiation intent; and determining to terminate the first group owner negotiation request including the first group owner negotiation intent when determining to send the response to the second apparatus, wherein the response, if sent, includes a group negotiation failure indication when the first group owner negotiation intent and the second group owner negotiation intent both indicate a necessity to be group owner.

2. The method of claim 1, wherein the second request message is received before a response is received from the second apparatus in response to the first request message.

3. The method of claim 1, further comprising:
receiving a response from the second apparatus in response to the first request message.

4. The method of claim 3, wherein a group owner is decided based on the information in the first request and the response.

5. The method of claim 1, further comprising:
sending the response to the second apparatus.

6. The method of claim 5, wherein a group owner is decided based on the information in the second request and the response.

7. The method of claim 1, wherein the first information comprises a peer-to-peer device address of the apparatus and the second information comprises a peer-to-peer device address of the second apparatus.

8. The method of claim 7, wherein the peer-to-peer device address of the apparatus is a media access control (MAC) address of the apparatus and the peer-to-peer device address of the second apparatus is a MAC address of the second apparatus.

9. The method of claim 7, wherein the determining whether to send the response is based on whether the peer-to-peer device address of the apparatus is higher or lower than the peer-to-peer device address of the second apparatus.

10. The method of claim 9, wherein the determining whether to send the response comprises:
determining to send the response when the peer-to-peer device address of the apparatus is higher than the peer-to-peer device address of the second apparatus; and
determining to abstain from sending the response when the peer-to-peer device address of the apparatus is lower than the peer-to-peer device address of the second apparatus.

11. An apparatus, comprising:
means for sending a first request message to a second apparatus, the first request message being associated with first information;
means for receiving a second request message from the second apparatus, the second request message being associated with second information;
means for comparing the first information and the second information;
means for determining whether to send a response to the second apparatus in response to the second request message based on the comparison of the first information and the second information;
means for determining to discard the second request message when determining to abstain from sending the response,
wherein the first request message is a first group owner negotiation request including a first group owner negotiation intent, the second request message is a second group owner negotiation request including a second group owner negotiation intent, and the response is a group owner negotiation response, wherein if the response is sent to the second apparatus in response to the second request message, the group owner negotiation response includes the first group owner negotiation intent; and means for determining to terminate the first group owner negotiation request including the first group owner negotiation intent when determining to send the response to the second apparatus, wherein the response, if sent, includes a group negotiation failure indication when the first group owner negotiation intent and the second group owner negotiation intent both indicate a necessity to be group owner.

12. The apparatus of claim 11, wherein the second request message is received before a response is received from the second apparatus in response to the first request message.

13. The apparatus of claim 11, further comprising:
means for receiving a response from the second apparatus in response to the first request message.

14. The apparatus of claim 13, wherein a group owner is decided based on the information in the first request and the response.

15. The apparatus of claim 11, further comprising:
means for sending the response to the second apparatus.

16. The apparatus of claim 15, wherein a group owner is decided based on the information in the second request and the response.

17. The apparatus of claim 11, wherein the first information comprises a peer-to-peer device address of the apparatus and the second information comprises a peer-to-peer device address of the second apparatus.

18. The apparatus of claim 17, wherein the peer-to-peer device address of the apparatus is a media access control (MAC) address of the apparatus and the peer-to-peer device address of the second apparatus is a MAC address of the second apparatus.

19. The apparatus of claim 17, wherein the means for determining whether to send the response is based on whether the peer-to-peer device address of the apparatus is higher or lower than the peer-to-peer device address of the second apparatus.

20. The apparatus of claim 19, wherein the means for determining whether to send the response:
determines to send the response when the peer-to-peer device address of the apparatus is higher than the peer-to-peer device address of the second apparatus; and
determines to abstain from sending the response when the peer-to-peer device address of the apparatus is lower than the peer-to-peer device address of the second apparatus.

21. A computer program product in an apparatus, comprising:
a non-transitory computer-readable medium comprising code for:
sending a first request message to a second apparatus, the first request message being associated with first information;
receiving a second request message from the second apparatus, the second request message being associated with second information;
comparing the first information and the second information;

determining whether to send a response to the second apparatus in response to the second request message based on the comparison of the first information and the second information;

determining to discard the second request message when determining to abstain from sending the response, wherein the first request message is a first group owner negotiation request including a first group owner negotiation intent, the second request message is a second group owner negotiation request including a second group owner negotiation intent, and the response is a group owner negotiation response, wherein if the response is sent to the second apparatus in response to the second request message, the group owner negotiation response includes the first group owner negotiation intent; and determining to terminate the first group owner negotiation request including the first group owner negotiation intent when determining to send the response to the second apparatus, wherein the response, if sent, includes a group negotiation failure indication when the first group owner negotiation intent and the second group owner negotiation intent both indicate a necessity to be group owner.

22. The computer program product of claim 21, wherein the second request message is received before a response is received from the second apparatus in response to the first request message.

23. The computer program product of claim 21, wherein the non-transitory computer-readable medium further comprises code for:
receiving a response from the second apparatus in response to the first request message.

24. The computer program product of claim 23, wherein a group owner is decided based on the information in the first request and the response.

25. The computer program product of claim 21, wherein the non-transitory computer-readable medium further comprises code for:
sending the response to the second apparatus.

26. The computer program product of claim 25, wherein a group owner is decided based on the information in the second request and the response.

27. The computer program product of claim 21, wherein the first information comprises a peer-to-peer device address of the apparatus and the second information comprises a peer-to-peer device address of the second apparatus.

28. The computer program product of claim 27, wherein the peer-to-peer device address of the apparatus is a media access control (MAC) address of the apparatus and the peer-to-peer device address of the second apparatus is a MAC address of the second apparatus.

29. The computer program product of claim 27, wherein the code for determining whether to send the response makes the determination based on whether the peer-to-peer device address of the apparatus is higher or lower than the peer-to-peer device address of the second apparatus.

30. The computer program product of claim 29, wherein the code for determining whether to send the response comprises code for:
determining to send the response when the peer-to-peer device address of the apparatus is higher than the peer-to-peer device address of the second apparatus; and
determining to abstain from sending the response when the peer-to-peer device address of the apparatus is lower than the peer-to-peer device address of the second apparatus.

31. An apparatus for wireless communication, comprising:
a processing system configured to:
send a first request message to a second apparatus, the first request message being associated with first information;
receive a second request message from the second apparatus, the second request message being associated with second information;
compare the first information and the second information;
determine whether to send a response to the second apparatus in response to the second request message based on the comparison of the first information and the second information; and
determine to discard the second request message when determining to abstain from sending the response,
wherein the first request message is a first group owner negotiation request including a first group owner negotiation intent, the second request message is a second group owner negotiation request including a second group owner negotiation intent, and the response is a group owner negotiation response, wherein if the response is sent to the second apparatus in response to the second request message, the group owner negotiation response includes the first group owner negotiation intent; and
determine to terminate the first group owner negotiation request including the first group owner negotiation intent when determining to send the response to the second apparatus,
wherein the response, if sent, includes a group negotiation failure indication when the first group owner negotiation intent and the second group owner negotiation intent both indicate a necessity to be group owner.

32. The apparatus of claim 31, wherein the second request message is received before a response is received from the second apparatus in response to the first request message.

33. The apparatus of claim 31, wherein the processing system is further configured to:
receive a response from the second apparatus in response to the first request message.

34. The apparatus of claim 33, wherein a group owner is decided based on the information in the first request and the response.

35. The apparatus of claim 31, wherein the processing system is further configured to:
send the response to the second apparatus.

36. The apparatus of claim 35, wherein a group owner is decided based on the information in the second request and the response.

37. The apparatus of claim 31, wherein the first information comprises a peer-to-peer device address of the apparatus and the second information comprises a peer-to-peer device address of the second apparatus.

38. The apparatus of claim 37, wherein the peer-to-peer device address of the apparatus is a media access control (MAC) address of the apparatus and the peer-to-peer device address of the second apparatus is a MAC address of the second apparatus.

39. The apparatus of claim 37, wherein the processing system is configured to determine whether to send the response based on whether the peer-to-peer device address of the apparatus is higher or lower than the peer-to-peer device address of the second apparatus.

40. The apparatus of claim 39, wherein the processing system is configured to determine whether to send the response by:

determining to send the response when the peer-to-peer device address of the apparatus is higher than the peer-to-peer device address of the second apparatus; and determining to abstain from sending the response when the peer-to-peer device address of the apparatus is lower than the peer-to-peer device address of the second apparatus.

\* \* \* \* \*